(12) United States Patent
Taubman et al.

(10) Patent No.: US 11,159,810 B2
(45) Date of Patent: Oct. 26, 2021

(54) METHOD AND APPARATUS FOR COMMUNICATING AND RECOVERING MOTION INFORMATION

(71) Applicant: NEWSOUTH INNOVATIONS PTY LIMITED, Sydney (AU)

(72) Inventors: David Scott Taubman, Redfern (AU); Aous Thabit Naman, Oxley Park (AU)

(73) Assignee: NewSouth Innovations Pty Limited, Sydney (AU)

( * ) Notice: Subject to any disclaimer, the term of this patent is extended or adjusted under 35 U.S.C. 154(b) by 0 days.

(21) Appl. No.: 16/032,404

(22) Filed: Jul. 11, 2018

(65) Prior Publication Data

US 2018/0324449 A1 Nov. 8, 2018

Related U.S. Application Data

(63) Continuation of application No. 14/343,473, filed as application No. PCT/AU2012/001078 on Sep. 10, 2012, now abandoned.

(30) Foreign Application Priority Data

Sep. 9, 2011 (AU) ............................... 2011903669

(51) Int. Cl.
*H04N 19/44* (2014.01)
*H04N 19/63* (2014.01)
(Continued)

(52) U.S. Cl.
CPC ............. *H04N 19/44* (2014.11); *H04N 19/46* (2014.11); *H04N 19/53* (2014.11);
(Continued)

(58) Field of Classification Search
CPC .......... H04N 19/00545; H04N 19/006; H04N 19/00533; H04N 19/00624; H04N 19/00781; H04N 19/00818
See application file for complete search history.

(56) References Cited

U.S. PATENT DOCUMENTS 7,095,786 B1 * 8/2006 Schonfeld ............. H04N 19/51
375/240.16
7,974,475 B1 * 7/2011 Minter ................. G06K 9/6203
382/209

(Continued)

OTHER PUBLICATIONS

"An Object-based Video Coding Framework for Video Sequences Obtained from Static Cameras"—Asaad Hakeem, Khurram Shafique, and Mubarak Shah; Proceedings of the 13th annual ACM international conference on Multimedia; pp. 608-617. (Year: 2005).*

(Continued)

*Primary Examiner* — Mainul Hasan
(74) *Attorney, Agent, or Firm* — Ballard Spahr LLP

(57) ABSTRACT

This invention describes a method for communicating crude motion information using tracking metadata and recovering more accurate motion information from the received tracking metadata and partial video frame data; in particular, we use metadata to convey crude boundaries of objects in the scene and signal motion information for these objects. The proposed method leaves the task of identifying the exact boundaries of an object to the decoder/client. The proposed method is particularly appealing when metadata itself carries semantics that the client is interested in, such as tracking information in surveillance applications, because, in this case, metadata does not constitute an overhead. The proposed method involves motion descriptions that can be used to predict the appearance of an object in any one frame from its appearance in any other frame that contains the object. That is, the motion information itself allows locations within (Continued)

an object to be invertibly mapped to locations within the same object in any other relevant frame. This is a departure from conventional motion coding schemes, which tightly-couple motion information to the prediction strategy. This property makes the proposed method particularly suitable for applications which require flexible access to the content.

11 Claims, 8 Drawing Sheets

(51) Int. Cl.
  *H04N 19/61* (2014.01)
  *H04N 19/46* (2014.01)
  *H04N 19/53* (2014.01)
  *H04N 19/543* (2014.01)
(52) U.S. Cl.
  CPC ........... *H04N 19/543* (2014.11); *H04N 19/61* (2014.11); *H04N 19/63* (2014.11)

(56) References Cited

U.S. PATENT DOCUMENTS

| | | | | |
|---|---|---|---|---|
| 2006/0008008 A1* | 1/2006 | Song | ..................... | H04N 19/573 375/240.16 |
| 2006/0050973 A1* | 3/2006 | Ishikawa | ............ | H04N 21/6587 382/232 |
| 2006/0067585 A1* | 3/2006 | Pace | ....................... | H04N 19/53 382/243 |
| 2010/0124274 A1* | 5/2010 | Cheok | ................... | H04N 19/152 375/240.03 |
| 2011/0002388 A1* | 1/2011 | Karczewicz | ........... | H04N 19/46 375/240.15 |
| 2011/0200097 A1* | 8/2011 | Chen | .................... | H04N 19/137 375/240.02 |

OTHER PUBLICATIONS

"Hierarchical Model-based Motion Estimation"—James R. Bergen, P. Anandan, Keith J, Hanna, Rajesh Hingorani, European Conference on Computer Vision, pp. 237-252, 1992. (Year: 1992).*
"A Hierarchical Approach to Robust Background Subtraction using Color and Gradient Information"—Omar Javed, Khurram Shafique, Mubarak Shah, Proceedings of the Workshop on Motion and Video Computing, 2002. (Year: 2002).*
"Analysis of Template Matching Prediction and Its Application to Parametric Overlapped Block Motion Compensation"—Tse-Wei Wang, Yi-Wen Chen, Wen-Hsiao Peng, Proceedings of 2010 IEEE International Symposium on Circuits and Systems (ISCAS). (Year: 2010).*
"Efficient Communication of Video Using Metadata"—Aous Thabit Naman, Duncan Edwards, and David Taubman; 2011 18th IEEE International Conference on Image Processing, Sep. 11-14, 2011. (Year: 2011).*
Escoda, O.D. et al., "Geometry—adaptive block partitioning for video coding," *IEEE International Conference on Acoustics, Speech and Signal Processing*, vol. 1, pp. I-657-I-660 (Apr. 2007).
Hakeem, A. et al., "An object-based video coding framework for video sequences obtained from static cameras," Proceedings of the 13th Annual ACM International Conference on Multimedia (Multimedia '05), Singapore, pp. 608-617 (Nov. 6, 2005).
Hung, E. et al., "On macroblock partition for motion compensation," *2006 IEEE International Conference on Image Processing*, pp. 1697-1700 (Oct. 2006).

ISO/IEF 15444-2:2004/FDAmd 3, "Extended roi boxes, xml boxing, compressed channel definition boxes, representation of floating point data and box-based file format for jpeg-xr," under development.
Mathew, R. et al., "Quad-tree motion modeling with leaf merging," *IEEE Transactions on Circuits and Systems for Video Technology*, vol. 20, No. 10, pp. 1331-1345 (Oct. 2010).
Mathew, R. et al., "Scalable modeling of motion and boundary geometry with quad-tree node merging," *IEEE Transactions on Circuits and Systems for Video Technology*, vol. 21, No. 2, pp. 178-192, (Feb. 2011).
Muhit, A. et al., "A fast approach for geometry-adaptive block partitioning," in *Picture Coding Symposium*, pp. 1-4 (2009).
Muhit, A. et al., "Motion compensation using geometry and an elastic motion model," *2009 16th IEEE International Conference on Image Processing*, pp. 621-624 (Nov. 2009).
Mukherjee, D. et al., "A region-based video coder using edge flow segmentation and hierarchical affine region matching," Proceedings of SPIE Conference on Visual Communications and Image Processing, vol. 3309, pp. 338-249 (Jan. 9, 1998).
Naman, A. et al., "JPEG2000-based scalable interactive video (jsiv)," *IEEE Transactions on Image Processing*, vol. 20, No. 9, pp. 2650-2663 (Sep. 2011).
Olson, C., "Maximum-likelihood template matching," Proceedings of the IEEE Conference on Computer Vision and Patter Recognition, vol. 2, pp. 52-57 (Jun. 13-15, 2000).
Petrou, M. et al., "Multi-level probabilistic relaxation," Proceedings of the Eighth British Machine Vision Conference 1997 (BMVC 1997), University of Essex, UK, pp. 60-69 (Sep. 1997).
Secker, A. et al., "Lifting-based invertible motion adaptive transform (limat) framework for highly scalable video compression," *IEEE Trans. Image Proc.*, vol. 12, No. 12, pp. 1530-1542 (Dec. 2003).
Soderberg, J., "Multidimensional hidden markov model applied to image and video analysis," PhD Thesis, Ecole Nationale Superieure des Telecommunications, Paris (Feb. 2007).
Tagliasacchi, M. et al., "Motion estimation by quadtree pruning and merging," *2006 IEEE International Conference on Multimedia and Expo*, pp. 1861-1864 (Jul. 2006).
Taubman, D. et al., "Fully scalable video compression with sample-adaptive lifting and overlapped block motion," *SPIE Electronic Imaging* (San Jose), vol. 5658, pp. 366-377, Jan. 2005.
International Search Report dated Dec. 21, 2012 for International Patent Application No. PCT/AU2012/001078, which was filed on Sep. 10, 2012 and published as WO 2013/033790 on Mar. 14, 2013 (Inventor—Taubman; Applicant—Newsouth Innovations Pty Limited) (6 pages).
Written Opinion dated Dec. 21, 2012 for International Patent Application No. PCT/AU2012/001078, which was filed on Sep. 10, 2012 and published as WO 2013/033790 on Mar. 14, 2013 (Inventor—Taubman; Applicant—Newsouth Innovations Pty Limited) (11 pages).
International Preliminary Report on Patentability dated Mar. 12, 2014 for International Patent Application No. PCT/AU2012/001078, which was filed on Sep. 10, 2012 and published as WO 2013/033790 on Mar. 14, 2013 (Inventor—Taubman; Applicant—Newsouth Innovations Pty Limited) (12 pages).
Restriction Requirement dated Jun. 26, 2017 by the U.S. Patent and Trademark Office for U.S. Appl. No. 14/343,473, filed May 22, 2014 and published as US 2014/0307798 on Oct. 16, 2014 (Inventor—Taubman et al.; Applicant—Newsouth Innovations Pty, Ltd.) (7 pages).
Non-Final Office Action dated Jan. 11, 2018 by the U.S. Patent and Trademark Office for U.S. Appl. No. 14/343,473, filed May 22, 2014 and published as US 2014/0307798 on Oct. 16, 2014 (Inventor—Taubman et al.; Applicant—Newsouth Innovations Pty, Ltd.) (28 pages).

* cited by examiner

METHOD AND APPARATUS FOR COMMUNICATING AND RECOVERING MOTION INFORMATION

CROSS REFERENCE TO RELATED APPLICATIONS

The present application is a continuation of U.S. application Ser. No. 14/343,473, filed May 22, 2014, which is a U.S. National Phase application of International Application No. PCT/AU2012/001078, filed Sep. 10, 2012, which claims priority to Australian Patent Application No. 2011903669, filed Sep. 9, 2010, all of which applications are incorporated herein fully by this reference.

FIELD OF THE INVENTION

The present invention relates to a method and apparatus for efficient communication of motion video sequences, and particularly, but not exclusively to a way of describing and communicating motion video, with the aid of metadata.

BACKGROUND OF THE INVENTION

In the following description, a number of documentary references are referred to. These references are listed at the end of the description, before the claims. The references are numbered (the numbers being placed in square brackets) and are refered to by that numbering. The content of the references is hereby incorporated into this description.

Motion modeling is a central feature of virtually all video compression and communication systems. The motion information obtained during motion modeling are used by a video decoding system to generate a prediction for the frame being decoded (known as the target frame) from a set of already decoded frames (known as reference frames); the video decoding system warps the reference frames so as to align their spatial features with those of the target frame, in a process known as motion compensation. Given that the decoding system is able to perform this warping, it is sufficient for the video encoding system to provide the decoding system with enough information to update or correct the areas where prediction fails.

Many video compression and communication systems have been devised; these systems can be categorized, depending on where motion compensation is employed, into two groups: systems that employ motion compensation during the encoding and decoding of the video sequence; and systems that employ motion compensation only during the decoding stage. The former category includes conventional "closed-loop" coding schemes such as MPEG1 to MPEG4; it also includes some "open-loop" schemes such as wavelet-based video coding (e.g. [1]). The latter category includes distributed video coding (DVC) systems and the recently-introduced JPEG2000-based scalable interactive video (JSIV) paradigm [2, 3]. This invention is particularly applicable to the second category and the description in this document focuses on the application to JSIV; nevertheless, the invention may also find useful application in systems that perform motion compensation in both the encoder and decoder.

The JSIV paradigm allows for efficient and highly flexible delivery of video content in an interactive setting. In particular, JSIV allows highly flexible and efficient access to arbitrary frames or regions of frames while still supporting efficient video streaming. This is achieved by compressing frames individually using the highly scalable JPEG2000 standard, but serving selected code-blocks from selected frames in an intelligent manner, together with motion information, so that the client can reconstruct the missing elements. JSIV only serves actual frame data in contrast to conventional video coding approaches, which normally sends quantized residues (i.e. differences between prediction and actual frame data).

In all published descriptions to date, JSIV relies upon the explicit communication of complete motion fields between server and client, where conventional motion estimation and encoding schemes are employed. These schemes expend a considerable portion of their motion bit-rate refining the motion description in the vicinity of object boundaries, where the underlying motion changes discontinuously or is not well defined. In fact, recent advances in motion modeling have largely focused on careful partitioning of motion blocks in the vicinity of such boundaries [4-7] and compact representation of the numerous motion elements that need to be described in these regions [8-10].

SUMMARY OF THE INVENTION

In accordance with a first aspect, the present invention provides a method for recovering motion information within multiple frame media content, using video frame sample data for some frames, together with auxiliary motion metadata that carries some information about the motion between frames, involving the following steps:

(a) selection of two or more reference frames to be used in predicting a further frame;

(b) using the motion metadata to identify at least two spatial domains within a first reference frame, to group each of these with a corresponding spatial domain in each other reference frame, and to determine a parametric representation of motion between corresponding domains in different reference frames;

(c) using the motion representations, domain correspondences and reference video frame sample values to determine validity information for each overlapping domain within the first reference frame;

(d) using the parametric motion representations, domain correspondences and reference video frame sample values to determine validity information for each overlapping domain within each other reference frame;

(e) using the parametric motion representations, validity information and reference frame sample values to form a prediction of said further frame; and (f) iteratively applying these steps to the prediction of additional frames.

In accordance with a second aspect, the present invention provides a multiresolution method for comparing two images over a spatial domain of interest to determine a set of likelihood ratios for each resolution level, in which each location within the resolution level has its own likelihood ratio that expresses the probability that the spatial features of the two images are matched at said location, divided by the probability that the spatial features of the two images are not matched at said location, involving the steps of:

(a) decomposing each image into a multi-resolution hierarchy;

(b) determining a first set of likelihood ratios for each resolution level based on spatial neighbourhoods of the associated locations in each of the two images within said resolution level;

(c) determining a second set of likelihood ratios for each resolution level by combining the first set of likelihood ratios with the final set of likelihood ratios determined at a lower resolution level, except at the lowest resolution level, where the first and second sets of likelihood ratios are the same;

(d) determining a final set of likelihood ratios for each location in each resolution level by applying an edge refinement process to the second set of likelihood ratios.

A central idea of at least an embodiment of this invention is to avoid the need for such fine partitioning (as discussed in refs [4-10]), by exploiting the spatial structure of a set of reference frames to infer appropriate boundaries. In an embodiment, instead of a densely populated collection of motion vectors, what is communicated to the decoder is a small number of sparsely parameterized, overlapping descriptions of motion that is smooth and invertible over their respective domains. Since the motion fields overlap one another, they offer multiple ways to form the predicted frame from its reference frames. For this reason, a key task is to find an appropriate way of segmenting the domain of each motion field into regions where it is most suitable for prediction. This embodiment is based around the idea that this segmentation can be performed by exploiting the available reference frame samples and therefore need not be explicitly described or communicated to the decoder. The embodiment performs its segmentation within the individual reference frames and then maps this segmentation information onto the target frame, where it is used to determine the most appropriate prediction.

An embodiment of the invention can perform multi-resolution segmentation, which is more suitable when the frames of the video sequence are communicated using JPEG2000, as is the case with JSIV; in this case, the embodiment exploits the available frame information in each resolution, performing segmentation in each resolution, if desired. The embodiment can also combine segmentation information from multiple resolutions to generate a full-resolution predicted frame. In the case of conventional video coding approaches, the embodiment can perform segmentation at full resolution only, or it can generate a multi-resolution description of the frames under consideration before performing segmentation.

Potential applications of embodiments of this invention in the context of JSIV include video conferencing and interactive dissemination of surveillance content. State of the art surveillance systems analyze the content to find and track features of interest, producing tracking metadata. There is a general trend to move such analysis to the cameras themselves, so that original source data from these cameras contains both frame data and tracking metadata. Tracking metadata aligns very well with the mechanisms of embodiments of this invention. In this context, a tracked object may be considered to provide hints about the "foreground" layer of motion information, while a global background model (e.g., affine or perspective) provides the second layer of hints about the background motion information. In this JSIV application, both the tracking metadata and the frame samples can be progressively disseminated to an interactive client using the tools and methods defined by the JPIP standard (IS15444-9).

It is reasonable to expect, in such applications, that the tracking metadata would have intrinsic interest to the remote client, possibly greater interest than the majority of the video frame data. What this means is that the tracking metadata effectively comes for free and should be exploited to facilitate the efficient communication of the video frames, as and when they become of interest. If only a few "reference" frames are available for reconstruction, the missing frames are simply predicted using the tracking metadata, which involves the same segmentation problem outlined above.

At least an embodiment of the invention has the advantage that it can operate entirely within the decoding system, without requiring an encoding system to guide it to the right segmentation or prediction choices. An embodiment of the invention performs its segmentation within the reference frames. An embodiment can perform segmentation on multi-resolution representations of frames, exploiting information available in each resolution independently as well as combining segmentation information from many resolutions.

An embodiment of the invention estimates probabilistic segmentation fields rather than binary segmentation masks. An embodiment of the invention maps the segmentation fields found within each relevant reference frame onto the target frame, using both the foreground and background motion models, combining the multitude of mapped segmentation fields to determine the most appropriate way to predict each location in the target frame from the sample values in the reference frames.

Embodiments of the invention may utilise tracking metadata to carry its motion description.

In accordance with a third aspect, the present invention provides an apparatus for recovering motion information within multiple frame media content, using video frame sample data for some frames, together with motion data that carries some information about the motion between frames, the apparatus comprising a processing apparatus arranged to implement the following steps:

(a) selection of two or more reference frames to be used in predicting a further frame;

(b) using the motion data to identify at least two spatial domains within a first reference frame, to group each of these with a corresponding spatial domain in each other reference frame, and to determine a parametric representation of motion between corresponding domains in different reference frames;

(c) using the motion representations, domain correspondences and reference video frame sample values to determine validity information for each overlapping domain within the first reference frame;

(d) using the parametric motion representations, domain correspondences and reference video frame sample values to determine validity information for each overlapping domain within each other reference frame;

(e) using the parametric motion representations, validity information and reference frame sample values to form a prediction of said further frame.

In accordance with a fourth aspect, the present invention provides an apparatus for comparing two images over a spatial domain of interest to determine a set of likelihood ratios for each resolution level, in which each location within the resolution level has its own likelihood ratio that expresses the probability that the spatial features of the two images are matched at said location, divided by the probability that the spatial features of the two images are not matched at said location, the apparatus comprising a processor configured to implement the steps of:

(a) decomposing each image into a multi-resolution hierarchy;

(b) determining a first set of likelihood ratios for each resolution level based on spatial, neighbourhoods of the associated locations in each of the two images within said resolution level;

(c) determining a second set of likelihood ratios for each resolution level by combining the first set of likelihood ratios with the final set of likelihood ratios determined at a lower resolution level, except at the lowest resolution level, where the first and second sets of likelihood ratios are the same.

In accordance with a fifth aspect, the present invention provides a method for recovering motion information within multiple frame media content, using video frame sample data for some frames, together with an auxiliary motion data that carries some information about the motion between frames, comprising the steps of recovering a more accurate description of the region where the motion information is valid from the auxiliary motion data, a crude domain description, and the partial video frame data.

In accordance with a sixth aspect, the present invention provides a method for efficient communication of motion video sequences, comprising steps of receiving motion information together with a crude description of the domain where the motion information is applicable, and receiving partial frame data and recovering a more accurate description of the region where the motion information is valid from the motion information itself, its crude domain description and the partial video frame data.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF EMBODIMENTS OF THE INVENTION

In this document, we first introduce the various concepts of embodiments of the invention in a simplified setup by imposing some restrictions. Then, we extend these concepts to the general case in subsequent sections, removing these restrictions.

Domains, Motion Models and Prediction

We start this subsection by introducing the concepts of the invention in a single-resolution embodiment; we extend these concepts to a multi-resolution embodiment in next subsection.

A Single-Resolution Embodiment

Figure 1:
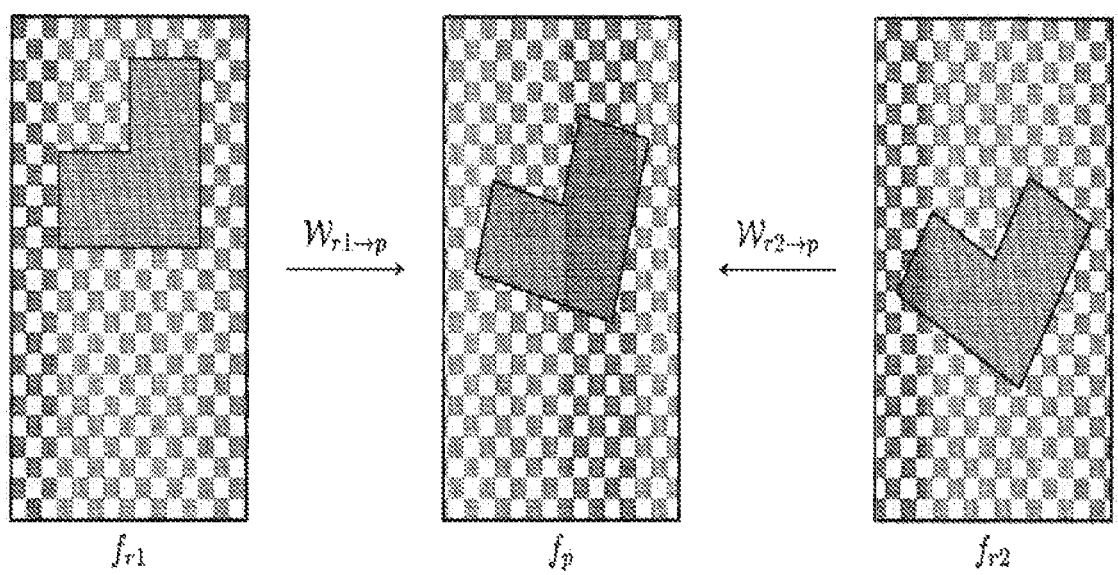
FIG. 1 is a diagram illustrating the use of two reference frames for prediction.

To predict a given frame, this embodiment employs a set of reference frames. To keep things simple in this section,
we consider the case in which a predicted frame, $f_p$, is predicted from two reference frames, $f_{r1}$ and $f_{r2}$, as shown in FIG. 1. The use of two reference frames for prediction is encountered in virtually all popular video codecs, those based on motion-compensated wavelet transforms, as well as video communication strategies in which motion is exploited only at the decoder (e.g., DVC and JSIV). In most cases, the reference frames lie on either side (temporally) of the predicted frame as shown, but this need not be the case.

Referring to FIG. 1, Frame $f_p$ is predicted from two reference frames, $f_{r1}$ and $f_{r2}$. Each reference frame is motion-compensated before being used in prediction.

Figure 2:
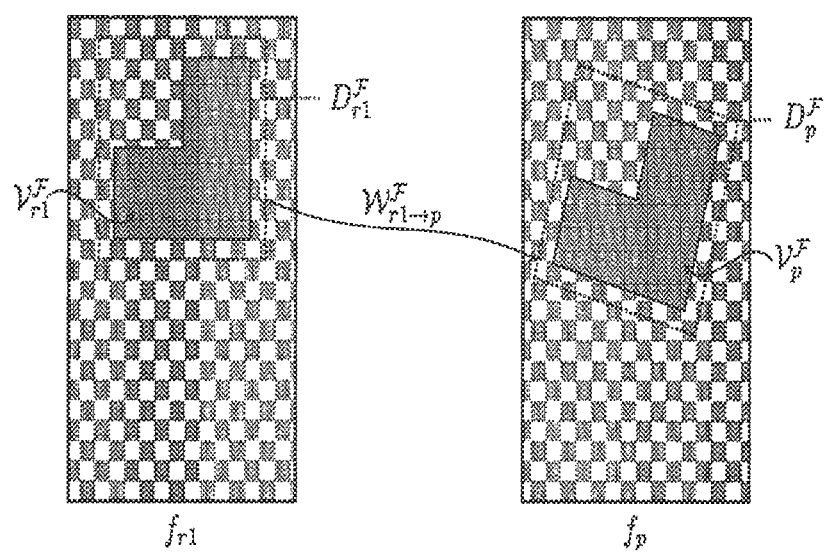
FIG. 2 is a diagram illustrating domain mapping utilising an embodiment of the present invention.

Prediction involves a mapping from a reference frame to a predicted frame; we write $\mathcal{W}_{r1 \to p}$ for the mapping from frame $f_{r1}$ to frame $f_p$. In this embodiment, each mapping has an associated domain at the reference frame, denoted by $D_{r1}$, and a corresponding domain at the target frame, denoted by $D_p$, on which the mapping is defined. Although the mapping is defined over the whole domain in each frame, it is usually only valid for some region within each domain; we write $\mathcal{V}_{r1}$ and $\mathcal{V}_p = \mathcal{W}_{r1 \to p}(\mathcal{V}_{r1})$ for the regions inside $D_{r1}$ and $D_p$ between which the mapping is valid. FIG. 2 shows such a scenario; the foreground mapping $\mathcal{W}^{\mathcal{F}}_{r1 \to p}$ maps the foreground domain $D^{\mathcal{F}}_{r1}$ from frame $f_{r1}$ to the foreground domain $D^{\mathcal{F}}_p$ of frame $f_p$, where the mapping is valid only between the foreground regions $\mathcal{V}^{\mathcal{F}}_{r1}$ and $\mathcal{V}^{\mathcal{F}}_p$.

Although the foreground mapping, $\mathcal{W}^{\mathcal{F}}_{r1 \to r}$, is defined over all the foreground domain, $D^{\mathcal{F}}_{r1}$, in the reference frame, $f_{r1}$, and the target foreground domain, $D^{\mathcal{F}}_p$, in predicted frame, $f_p$, it is only valid on the regions $\mathcal{V}^{\mathcal{F}}_{r1}$ and $\mathcal{V}^{\mathcal{F}}_p$.

Many motion models have been devised in the literature; examples include block-based translation models, mesh-based affine models, B-spline parameterized models, . . . etc. Although any of these models can be used for the mapping operators discussed here, there are many advantages to using an invertible mapping. One benefit of invertible mapping is that it is possible to convert $\mathcal{W}_{r1 \to p}$ to $\mathcal{W}_{p \to r1}$, and as such, one model describes both forward and backward motion. Another benefit for invertible mapping is that it is possible to compose a few motion models to obtain another desired model; for example if the decoder has $\mathcal{W}_{r1 \to p}$ and $\mathcal{W}_{r1 \to r2}$, then it is possible to form $\mathcal{W}_{r2 \to p}$ as $\mathcal{W}_{r1 \to p} \circ \mathcal{W}^{-1}_{r1 \to r2}$. This dramatically reduces the number of models that need to be stored and/or delivered to the decoding system. It also allows the decoding system to form predictions in ways that might not have been anticipated by an encoding system. Examples of invertible mappings include mesh-based affine models, and B-spline parameterized motion over rectangular grids.

A domain can contain an object, such as a car, or part of an object, such as an arm of a human being, or other features, such as shadows or flash illuminations. It is possible that a given domain overlaps with other domains; a noteworthy example here is the background domain with which many foreground domains may potentially overlap.

Domains can be of any shape, but in general it is more convenient to express them using some simple geometrical shapes such as rectangles, unions of rectangles, or ellipses. Compared to irregular shapes, simple geometrical shapes can be compactly described and communicated to the decoder. The use of simple shapes is sufficient since the proposed segmentation algorithm should identify the actual valid region, which is often highly irregular; the valid region is not explicitly communicated.

This is a layered description of motion. Each domain with its mappings represents one layer that can deform from one frame to the other across the video sequence. The layers may or may not overlap each other; moreover overlapping layers may have a relative precedence order (i.e. one layer potentially covers another). There is always a background layer, having lower precedence than all other layers.

This embodiment is concerned primarily with the case of a predicted frame that has two domains, one domain for the foreground layer and one domain for the background layer. The methods described herein can be applied and extended to additional layers.

Figure 3:
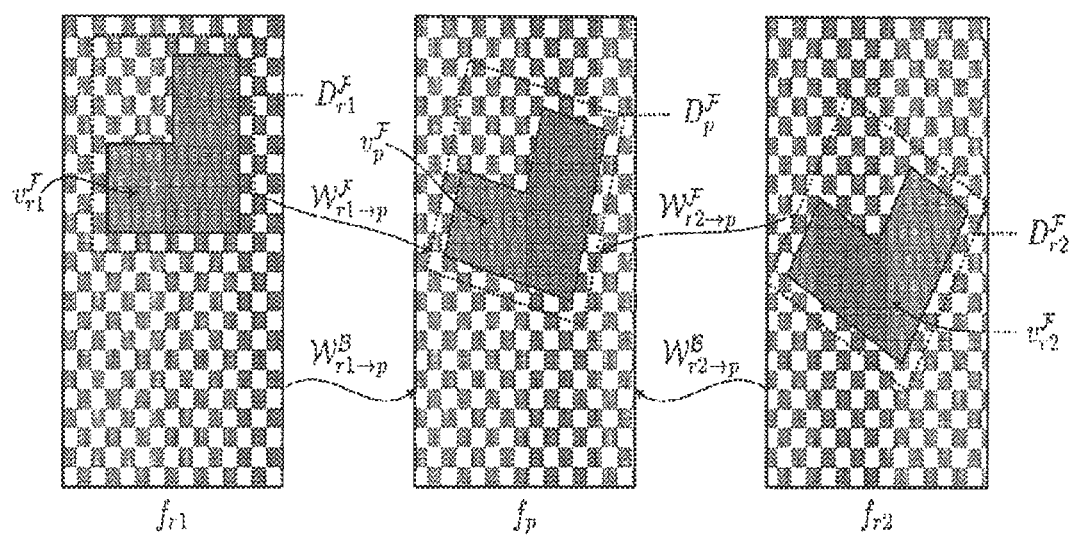
FIG. 3 is a diagram illustrating mapping for foreground and background domains in accordance with an embodiment of the present invention.

Thus, we have two background-layer mappings, one from $f_{r1}$, denoted by $W_{r1 \to p}^{\mathcal{B}}$, and one from $f_{r2}$, denoted by $W_{r2 \to p}^{\mathcal{B}}$; we similarly have two foreground-layer mappings denoted by $W_{r1 \to p}^{\mathcal{F}}$ and $W_{r2 \to p}^{\mathcal{F}}$. These mappings are shown in FIG. 3.

The role of the segmentation algorithm is to find $V_{r1}^{\mathcal{F}}$ and $V_{r2}^{\mathcal{F}}$. Since estimating $V_{r1}^{\mathcal{F}}$ and $V_{r2}^{\mathcal{F}}$ is error-prone, we prefer to estimate the likelihood that a pixel at position k belongs to these regions; we write $v_{r1}^{\mathcal{F}}[k]$ and $v_{r2}^{\mathcal{F}}[k]$, respectively, for these likelihoods, letting them take on values in the range [0,1]. We leave discussing how to estimate $v_{r1}^{\mathcal{F}}[k]$ and $v_{r2}^{\mathcal{F}}[k]$ in "Determination of Foreground Likelihoods" below.

Figure 4:
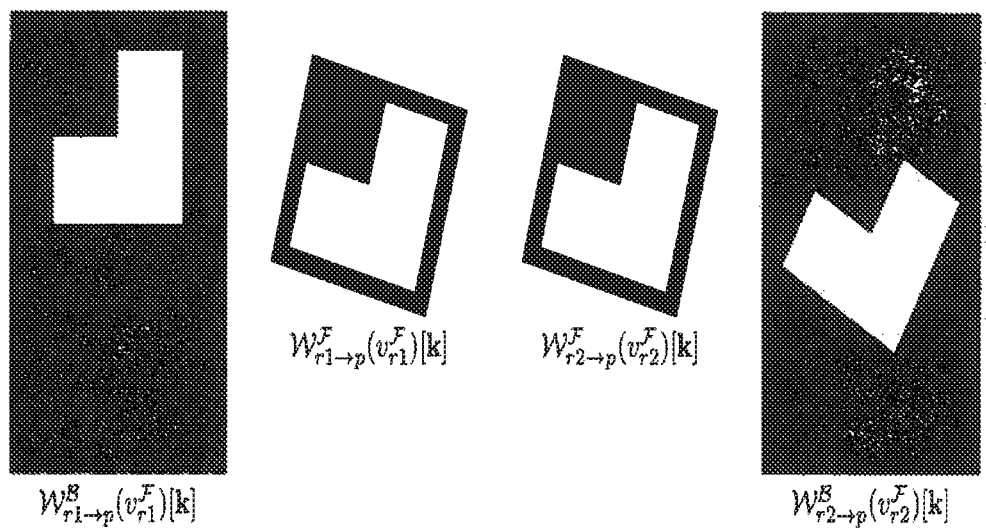
FIG. 4 is a diagram illustrating likelihoods used during the reconstruction of a target frame (of FIG. 3), in accordance with an embodiment of the present invention.

To obtain the foreground likelihood in the predicted frame, $f_p$, we map the likelihoods from the reference frames, $f_{r1}$ and $f_{r2}$, to $f_p$, using $W_{r1 \to p}^{\mathcal{F}}$ and $W_{r2 \to p}^{\mathcal{F}}$, respectively; we write $v_{r1 \to p}^{\mathcal{F}}[k]=W_{r1 \to p}^{\mathcal{F}}(v_{r1}^{\mathcal{F}})[k]$ and $v_{r2 \to p}^{\mathcal{F}}[k]=W_{r2 \to p}^{\mathcal{F}}(v_{r2}^{\mathcal{F}})[k]$ for these mapped foreground likelihoods. Ideally, both of these mapped likelihoods should yield the same foreground likelihood in the predicted frame, $v_{\to p}^{\mathcal{F}}[k]$, but, in practice, this is usually not the case due to errors in estimation. In the setting discussed here, the predicted background likelihoods, $v_{r1 \to p}^{\mathcal{B}}[k]$ and $v_{r2 \to p}^{\mathcal{B}}[k]$, can be obtained from $v_{r1 \to p}^{\mathcal{B}}[k]=1-v_{r1 \to p}^{\mathcal{F}}[k]$ and $v_{r2 \to p}^{\mathcal{B}}[k]=1-v_{r2 \to p}^{\mathcal{F}}[k]$. Some of these mapped likelihoods are shown in FIG. 4.

The approach in this embodiment for estimating the foreground layer in the predicted frame, denoted by $f_{\to p}^{\mathcal{F}}$, is to combine these estimates in a way that gives preference to the estimates that have high likelihood while suppressing those with low likelihood. In the embodiment described here, a weighted average of the foreground layer estimates is formed, given by $$f_{\to p}^{\mathcal{F}}[k] = \sum_{r \in \{r1,r2\}} (\delta + v_{r \to p}^{\mathcal{F}}[k] \cdot f_{r \to p}^{\mathcal{F}}[k]) \bigg/ \sum_{r \in \{r1,r2\}} (\delta + v_{r \to p}^{\mathcal{F}}[k]) \quad (1)$$

In the above, all computations are performed point-wise at each location k, and δ is a small positive value whose purpose is only to ensure that (1) is well-defined everywhere. The background layer estimation, denoted by $f_{\to p}^{\mathcal{B}}[k]$, is similarly estimated using (1) with every $\mathcal{F}$ replaced by a $\mathcal{B}$.

The idea in forming the overall prediction of $f_p$, denoted by $f_{\to p}$, is to prefer the foreground as long as it has high likelihood. Here, we set the predicted foreground likelihood, $v_{\to p}^{\mathcal{F}}[k]$, to the highest value of the foreground layer likelihood, that is $$v_{\to p}^{\mathcal{F}}[k] = \max_{r \in \{r1,r2\}} \{v_{r \to p}^{\mathcal{F}}[k]\} \quad (2)$$

It is conceivable to use other functions such as a linear combination of the two values or the minimum value. Then, the overall prediction for $f_p$ is $$f_{\to p}[k] = f_{\to p}^{\mathcal{F}}[k] \cdot v_{\to p}^{\mathcal{F}}[k] + f_{\to p}^{\mathcal{B}}[k] \cdot (1 - v_{\to p}^{\mathcal{F}}[k]) \quad (3)$$

A Multi-Resolution Embodiment

As above, here we also present the implementation in the context of reconstructing a prediction $f_{\to p}$ for frame $f_p$ from frames $f_{r1}$ and $f_{r2}$. In this context, frames $f_{r1}$ and $f_{r2}$ are either received in a multi-resolution format (such as in JPEG2000 representation) or are subject to a multi-resolution transformation. Examples of suitable transformations include the Discrete Wavelet Transform (DWT) and the Laplacian Pyramid, both of which are very well known to those skilled in the art. Each of these transform classes produces "detail images" at a succession of resolution levels. For the purpose of this description, the resolution levels are labeled d=0 (highest resolution) through to d=D (lowest resolution) and the detail images are denoted $f_{r1}^{(d)}$ and $f_{r2}^{(d)}$. In the case of Laplacian pyramids, $f_{r1}^{(0)}$ and $f_{r2}^{(0)}$ have the same dimensions as the original frame $f_{r2}$ but contain only the highest frequency details; each successive resolution level involves a reduction in the dimensions (we assume the typical value of 2 here) and represents lower frequency content from the relevant frames.

The DWT is similar, except that each resolution level d actually involves three detail subbands, typically labeled HL, LH and HH. To unify the discussion, we suppose here that the detail subband produced at level d of the DWT are subjected to one level of the DWT synthesis transform, with the missing LL band set to 0. This produces detail images $f_{r1}^{(d)}$ and $f_{r2}^{(d)}$ at level d that have virtually the same properties as those of the Laplacian Pyramid.

All the quantities of the single resolution embodiment have their multi-resolution counterparts. For example, the domain $D_p^{\mathcal{F}}$, the motion mapping $W_{r1 \to p}^{\mathcal{B}}$, and the valid region $V_{r1}^{\mathcal{F}}$ have their multi-resolution counterparts denoted by $D_p^{\mathcal{F},(d)}$, $W_{r1 \to p}^{\mathcal{B},(d)}$, and $V_{r1}^{\mathcal{F},(d)}$, respectively. In a continuous world, these multi-resolution quantities are obtained from their corresponding single-resolution quantities by scaling the latter quantities down by $2^d$; for example, motion parameters are divided by $2^d$. In a discrete world, these quantities can be approximated using any of many techniques known to those skilled in the art. Multi-resolution likelihood estimates, $v_{r1}^{\mathcal{F},(d)}$ for example, can be obtained using the multi-resolution likelihood estimation embodiment of "A Multi-Resolution Embodiment".

Although motion mapping can be performed by first synthesizing the reference frame, applying motion mapping at full resolution, and then analyzing the predicted frame back into multi-resolution representation, a more useful approach for this embodiment is to apply motion mapping at each resolution directly; these techniques are known to those skilled in the art and the interested reader can refer to [1].

With this in mind, (1), (2), and (3) are readily applicable at each resolution. The full-resolution predictor $f_{\to p}$ can be obtained by synthesizing all the $f_{\to p}^{(d)}$ terms with the coarsest LL-band.

The availability of some information from $f_p$ can be helpful in improving $f_{\to p}$; one possible approach is to replace the predicted samples in $f_{\to p}^{(d)}$ with the received samples if they are deemed of better quality.

Determination of Foreground Likelihoods

The foreground likelihood is estimated from a set of reference frames, which can themselves be reconstructed frames obtained from embodiment the invention to other reference frames. The estimation of foreground likelihood may be enhanced using partially reconstructed data from other frames, including the target frame itself. For example, if the target frame is represented using a multi-resolution transform (e.g., a wavelet transform), in which video frame data is available for some regions within some resolutions, this information can be used to improve the reliability of the foreground likelihood estimates formed in the reference frames. For the moment, however, we ignore such possibilities and focus entirely on the use of reference frame samples to determine foreground likelihood information within the reference frames.

A Single-Resolution Embodiment

The example implementation presented here estimates the likelihood information for frame $f_{r2}$ from frame $f_{r1}$. In order to do this, we map (i.e., motion compensate) frame $f_{r1}$ using both the foreground and background motion information (i.e., $W^{\mathcal{F}}_{r1 \to r2}$ and $W^{\mathcal{B}}_{r1 \to r2}$). The motion compensated versions of $f_{r1}$, denoted by $f^{\mathcal{F}}_{r1 \to r2}$ when the foreground mapping operator is used and $f^{\mathcal{B}}_{r1 \to r2}$ when the background mapping operator is used, are then compared with $f_{r2}$. In the absence of noise and other non-idealities, $f^{\mathcal{F}}_{r1 \to r2}[k]$ and $f_{r2}[k]$ should agree at locations k that belong to the foreground layer, whereas $f^{\mathcal{B}}_{r1 \to r2}[k]$ and $f_{r2}[k]$ are likely to agree better at other locations, bearing in mind that the background layer may be subject to occlusion. Background and foreground prediction errors are denoted by $$E_{\mathcal{B}}[k] = f_{r2}[k] - f^{\mathcal{B}}_{r1 \to r2}[k]$$

$$E_{\mathcal{F}}[k] = f_{r2}[k] - f^{\mathcal{F}}_{r1 \to r2}[k] \quad (4)$$

In one approach, a preliminary estimate for $\upsilon_{r2}[k]$ is obtained using $$\upsilon'_{r2}[k] = \begin{cases} 1 & E^2_{\mathcal{F}}[k] < E^2_{\mathcal{B}}[k] \\ 0 & E^2_{\mathcal{B}}[k] \leq E^2_{\mathcal{F}}[k] \end{cases} \quad (5)$$

This preliminary estimate is then subjected to a 5×5 uniform low-pass filter (moving average), leaving $\upsilon_{r2}[k]$ as the result. Of course, this estimate need only be formed within the mapped foreground domain $W^{\mathcal{F}}_{r1 \to r2}(D_{r1})$, since $\upsilon_{r2}[k]$ is known to be 0 outside that region.

The likelihood information for frame $f_{r1}$, denoted by $\upsilon_{r1}[k]$, can be similarly formed or it can be obtained from mapping $\upsilon_{r2}[k]$ back into the coordinates of frame $f_{r1}$ using $W^{\mathcal{F}}_{r2 \to r1} = (W^{\mathcal{F}}_{r1 \to r2})^{-1}$.

A Multi-Resolution Embodiment

The embodiment described here estimates the foreground likelihood at each resolution level d, starting at level d=D where the dimensions are smallest, and working up to the full resolution at level d=0. The process involves estimating the log-likelihood ratio of the probability of being in the foreground $P\{\mathcal{F}\}$ to the probability of being in the background $P\{\mathcal{B}\}$ at each location $n \in D^{\mathcal{F},(d)}_{r2}$. This process involves the following steps:

Generating Resolution-Dependent Observation Imagery

This step employs a multi-resolution representation of the frames $f^{\mathcal{F}}_{r1 \to r2}$ and $f_{r2}$ that is commonly known as a "Gaussian pyramid". We write $g_{r2}^{(d)}$ and $g^{\mathcal{F},(d)}_{r1 \to r2}$ for resolution d of the Gaussian pyramid in each of $f_{r2}$ and $f^{\mathcal{F}}_{r1 \to r2}$. The Gaussian pyramid is intimately related to the Laplacian pyramid, mentioned earlier, and the two can be generated together. In applications where the original images are compressed using a Discrete Wavelet Transform, the Gaussian pyramid image at resolution level d can be interpreted as image obtained by synthesizing the DWT subbands found at levels d+1, d+2 and so forth within the wavelet transform. Alternatively, the Gaussian pyramid image at resolution level d can be formed by starting with higher resolution imagery, performing the required motion warping operations, and then subjecting the result to a combination of low-pass filtering and downsampling.

In one embodiment of the invention, resolution-dependent observation images for resolution d are obtained by subjecting the corresponding Gaussian pyramid images at resolution d to a band-pass filtering (BPF) operation. The use of a BPF generates Laplacian-like images, but reduces the effect of aliasing that would arise if the detail subbands from a DWT were used directly.

In an alternate embodiment of the invention, a BPF is applied to the Gaussian pyramid images from resolution d−1 in order to create resolution-dependent observation images for resolution d. The BPF in this case is designed to pass the spatial frequency components corresponding to d while largely suppressing the higher frequency components present in the Gaussian images at level d−1. In this case, the observation image has twice the sampling resolution as that of resolution d, which can be useful in reducing the impact of aliasing effects.

We write $o_{r2}^{(d)}$ and $o^{\mathcal{F},(d)}_{r1 \to r2}$ to denote the observation images produced in accordance with the methods described above, for each resolution level d.

Estimating Log-Likelihood Ratio Contribution of Current Resolution

The log-likelihood ratio for the current resolution, d, denoted by $l_{r2}^{(d)}$ is obtained using a set of observations $\mathcal{O}^{(d)}$ that are derived from the resolution d observation images $o^{\mathcal{F},(d)}_{r1 \to r2}$ and $o_{r2}^{(d)}$. In the most general setting, the set of observations $\mathcal{O}^{(d)}$ can be the sample values themselves or some aggregate information about these samples (such as their mean or variance). The log-likelihood ratio is obtained from the following general expression $$l_{r2}^{(d)} = \log_2 \frac{P\{\mathcal{F} \mid \mathcal{O}^{(d)}\}}{P\{\mathcal{B} \mid \mathcal{O}^{(d)}\}} = \quad (6)$$

$$\log_2 \frac{P\{\mathcal{F}, \mathcal{O}^{(d)}\}}{P\{\mathcal{B}, \mathcal{O}^{(d)}\}} = \log_2 \frac{P\{\mathcal{O}^{(d)} \mid \mathcal{F}\} \cdot P\{\mathcal{F}\}}{P\{\mathcal{O}^{(d)} \mid \mathcal{B}\} \cdot P\{\mathcal{B}\}} = \log_2 \frac{P\{\mathcal{O}^{(d)} \mid \mathcal{F}\}}{P\{\mathcal{O}^{(d)} \mid \mathcal{B}\}}$$

where the probability models are derived from properties of the observation features, as described in the sequel. The last line of the above equation is valid under the assumption that $P\{\mathcal{F}\} = P\{\mathcal{B}\}$, which is both practical and reasonable for most embodiments of the invention.

In an embodiment of the invention, the following set of observations are employed in determining $l_{r2}^{(d)}$:

1. A set of ternary features, T. Ternary features extract the predominate features of an image in a way that is rather robust to noise and changes in illumination. To make it more robust to quantization errors, we first estimate an effective quantization step size $\Delta_L$. The value of $\Delta_L$ can be estimated at each location in each of the resolution-dependent observation images. For JPEG2000 compressed frames, for example, the value of $\Delta_L$ can be estimated from sub-band quantization parameters and the set of available coding passes in the relevant sub-band code blocks. For a given sample x[n] at location n at the resolution under consideration in the observation image $o^{\mathcal{F},(d)}_{r1 \to r2}$ or $o_{r2}^{(d)}$, as appropriate, we define $$x_+ = \begin{cases} x, & x > \Delta_L \\ \Delta_L, & \Delta_L \geq x > 0 \\ \Delta_L/2, & x = 0 \end{cases} \quad \text{and} \tag{7}$$

$$x_- = \begin{cases} x, & x < -\Delta_L \\ -\Delta_L, & -\Delta_L \leq x < 0 \\ -\Delta_L/2, & x = 0 \end{cases} \tag{8}$$

Then, the ternary features are given by $$T[n] = \begin{cases} 1, & x[n] > (x_+ * h_{LP})[n] \\ -1, & x[n] < (x_- * h_{LP})[n] \\ 0, & \text{otherwise} \end{cases} \tag{9}$$

where * denotes convolution and $h_{LP}[n]$ is a low-pass FIR filter. This produces $\tau_{r1 \to r2}^{\mathcal{F},(d)}[n]$ for $o_{r1 \to r2}^{\mathcal{F},(d)}$ and $T_{r2}^{(d)}[n]$ for $o_{r2}^{(d)}$.

2. A ternary feature count, $\mathcal{C}$, which is simply defined by $$C[n] = \sum_{j \in \mathcal{R}_n} |T[j]| \tag{10}$$

where $\mathcal{R}_n$ is the set of locations j that are located within a small neighborhood that is centred at n. The preferred embodiment is a disc with a radius r=3, although for the alternate embodiments mentioned earlier, in which each resolution level is represented at twice its natural sampling rate, the size of $\mathcal{R}_n$ is correspondingly increased. The count gives us an indication of the amount of activity in the neighborhood of n that is above the effective quantization level $\Delta_L$. In the absence of quantization, it can be shown that when the samples are dominated by sampling noise, $\mathcal{C}$ takes values of around 70-75% of the number of samples in $\mathcal{R}_n$, reducing to a smaller value in the vicinity of strong edges. This ternary feature yields observation values $C_{r1 \to r2}^{\mathcal{F},(d)}[n]$ and $c_{r2}^{(d)}[n]$, from which we also calculate a combined count for the two frames under consideration, given by $$C^{(d)}[n] = C_{r1 \to r2}^{\mathcal{F},(d)}[n] \cdot C_{r2}^{(d)}[n] \tag{11}$$

3. A structural measure, A, based on T. For each point n in T, we employ raised-cosine weighted fast Fourier transform, denoted by $FFT_{w[n]}$ on the neighbourhood of n to obtain a set of complex-valued DFT coefficients; we write c'[n] for the magnitude of these complex-valued coefficients. The set includes only one coefficient from each pair that are related through the well known complex-conjugate symmetry property; the set also excludes the DC coefficient. In the preferred embodiment, a 7×7 windowed FFT is employed, yielding a full set of 49 coefficients, from which 24 are retained. The vector $c'_n$ is formed from the magnitudes of the 24 unique non-DC coefficients at each location $n = [n_1, n_2]$; that is $$c'_n = |FFT_{w[n]}(T)| \tag{12}$$

To reduce the effect of noise, we average c'[n] to obtain $$c[n] = \sum_{i,j \in \{-1,1\}} c'[n_1 + i, n_2 + j] \tag{13}$$

Then, $$A'[n] = \frac{\|c[n]\|_1^2}{\|c[n]\|_2^2} \tag{14}$$

where $\| \|_n$ is the $L_n$ norm. Based on some experimentation, we notice that A'[n] attains values between 0.9 when the data is mostly noise and 0.3 when we have strong edge structures; therefore, we set $$A[n] = \min\left\{\max\left\{\frac{0.9 - A'[n]}{0.6}, 0\right\}, 1\right\} \tag{15}$$

The max and min operators above ensure that the value of A[n] stays within the interval [0,1], where values close to 1 indicate strong structures and closer to 0 indicate high randomness. This measure provides an indication of how structured the data is.

In alternative embodiments of the invention, where the resolution-dependent observation images are represented at twice their natural sampling rate, the specific dimensions and parameter values described above should be adjusted accordingly. Such adjustments will be apparent to those skilled in the art.

Using the method described above, structural measures $A_{r1 \to r2}^{\mathcal{F},(d)}[n]$ and $A_{r2}^{(d)}[n]$ are produced for each image at each location and resolution.

We also calculate combined structural measures, $A_\Delta^{(d)}$ and $A_\mu^{(d)}$, given by $$A_\Delta^{(d)}[n] = \frac{A_{r1 \to r2}^{\mathcal{F},(d)}[n]}{A_{r1 \to r2}^{\mathcal{F},(d)}[n] + A_{r2}^{(d)}[n]} \tag{16}$$

and $$A_\mu^{(d)}[n] = A_{r1 \to r2}^{\mathcal{F},(d)}[n] \cdot A_{r2}^{(d)}[n] \tag{17}$$

4. A correlation factor, $\rho^{(d)}$, given by $$\rho^{(d)}[n] = \frac{\sum_{j \in \mathcal{R}_n} (o_{r1 \to r2}^{\mathcal{F},(d)}[j] \cdot o_{r2}^{(d)}[j])}{\sqrt{\sum_{j \in \mathcal{R}_n} (o_{r1 \to r2}^{\mathcal{F},(d)}[j])^2} \cdot \sqrt{\sum_{j \in \mathcal{R}_n} (o_{r2}^{(d)}[j])^2}} \tag{18}$$

Alternatively, $\rho^{(d)}$ can be found from $$\rho^{(d)}[n] = \frac{\sum_{j \in \mathcal{R}_n} (|T_{r1 \to r2}^{\mathcal{F},(d)}[j]| \cdot o_{r1 \to r2}^{\mathcal{F},(d)}[j] \cdot |T_{r2}^{(d)}[j]| \cdot o_{r2}^{(d)}[j])}{\sqrt{\sum_{j \in \mathcal{R}_n} |T_{r1 \to r2}^{\mathcal{F},(d)}[j]| \cdot (o_{r1 \to r2}^{\mathcal{F},(d)}[j])^2} \cdot \sqrt{\sum_{j \in \mathcal{R}_n} |T_{r2}^{(d)}[j]| \cdot (o_{r2}^{(d)}[j])^2}} \tag{19}$$

Yet another definition for $\rho^{(d)}$ is $$\rho^{(d)}[n] = \frac{\sum_{j \in \mathcal{R}_n} (T_{r1 \to r2}^{\mathcal{F},(d)}[j] \cdot T_{r2}^{(d)}[j])}{\sqrt{\sum_{j \in \mathcal{R}_n} (T_{r1 \to r2}^{\mathcal{F},(d)}[j])^2} \cdot \sqrt{\sum_{j \in \mathcal{R}_n} (T_{r2}^{(d)}[j])^2}} \tag{20}$$

The purpose of the correlation factor is to identify the regions where both frames are very similar to each other. Other measures with similar attributes will be apparent to those skilled in the art as possible alternatives to those provided here.

5. An energy ratio, $M_\Delta^{(d)}$, given by $$M_\Delta^{(d)}[n] = \frac{\sum_{j \in \mathcal{R}_n} (o_{r1 \to r2}^{\mathcal{F},(d)}[j])^2}{\sum_{j \in \mathcal{R}_n} (o_{r1 \to r2}^{\mathcal{F},(d)}[j])^2 + \sum_{j \in \mathcal{R}_n} (o_{r2}^{(d)}[j])^2} \quad (21)$$

Alternatively, $M_\Delta^{(d)}$ can be calculated from $$M_\Delta^{(d)}[n] = \frac{\sum_{j \in \mathcal{R}_n} |T_{r1 \to r2}^{\mathcal{F},(d)}[j]| \cdot (o_{r1 \to r2}^{\mathcal{F},(d)}[j])^2}{\sum_{j \in \mathcal{R}_n} |T_{r1 \to r2}^{\mathcal{F},(d)}[j]| \cdot (o_{r1 \to r2}^{\mathcal{F},(d)}[j])^2 + \sum_{j \in \mathcal{R}_n} |T_{r2}^{(d)}[j]| \cdot (o_{r2}^{(d)}[j])^2} \quad (22)$$

Now, we are in a position to estimate the log-likelihood ratio, which is given by:

$$l_{r2}^{(d)} = \log_2 \frac{P\{O|\mathcal{F}\}}{P\{O|\mathcal{B}\}} = \log_2 \frac{P\{\rho, M_\Delta, A_\Delta, A_\mu, C|\mathcal{F}\}}{P\{\rho, M_\Delta, A_\Delta, A_\mu, C|\mathcal{B}\}}$$

Here, the superscript (d) has been removed for brevity. To reduce the complexity, we decompose the joint probability function above into the multiplication of a set of conditional probabilities and make some simplifying assumptions to get $$l_{r2}^{(d)} = \qquad (23)$$
$$\log_2 \frac{P\{\rho|A_\mu, C, \mathcal{F}\}}{P\{\rho|C, \mathcal{B}\}} + \log_2 \frac{P\{M_\Delta|A_\mu, C, \mathcal{F}\}}{P\{M_\Delta|A_\mu, C, \mathcal{B}\}} + \log_2 \frac{P\{A_\Delta|C, \mathcal{F}\}}{P\{A_\Delta|C, \mathcal{B}\}}$$

To further simplify the above, we assume that $C$ reduces the reliability of estimating $l_{r2}^{(d)}$. Under this assumption, we ignore the conditioning on $C$ but we multiply all the terms by a fixed function of $C$, denoted by $R(C)$; that is, $$l_{r2}^{(d)}[n] \approx \qquad (24)$$
$$R(C[n]) \cdot \left( \log_2 \frac{P\{\rho|A_\mu, \mathcal{F}\}}{P\{\rho|\mathcal{B}\}} + \log_2 \frac{P\{M_\Delta|A_\mu, \mathcal{F}\}}{P\{M_\Delta|A_\mu, \mathcal{B}\}} + \log_2 \frac{P\{A_\Delta|\mathcal{F}\}}{P\{A_\Delta|\mathcal{B}\}} \right)$$

The fixed function of $C$ should satisfy $R(C)=0$ when $C=0$ and $R(C)=1$ when $C$ is large; one such function is $$R(C[n]) = \begin{cases} 0, & \frac{C[n]}{|\mathcal{R}_n|} \leq 0.1 \\ \frac{\frac{C[n]}{|\mathcal{R}_n|} - 0.1}{0.1}, & 0.1 < \frac{C[n]}{|\mathcal{R}_n|} \leq 0.2 \\ 1, & \frac{C[n]}{|\mathcal{R}_n|} > 0.2 \end{cases} \quad (25)$$

where $|\mathcal{R}_n|$ is the number of elements in $\mathcal{R}_n$. The probabilities in (24) can be found experimentally or by modelling the underlying process.

Combining Log-Likelihood Ratio Estimates from Lower Resolutions

At each resolution except the coarsest this step involves taking into consideration the log-likelihood ratio from lower resolutions; this involves mixing the log-likelihood ratio for resolution d, denoted by $l_{r2}^{(d)}$, with the edge-refined combined log-likelihood ratio from the next coarser resolution, denoted by $e_{r2}^{(d+1)}$ to generate the combined log-likelihood ratio for resolution d, denoted by $h_{r2}^{(d)}$. The edge refinement procedure is described below. In an embodiment of the invention $h_{r2}^{(d)}$ is formed from $$h_{r2}^{(d)} = l_{r2}^{(d)} + \max\{1 - 2 \cdot A_\mu^{(d)}, 0\} \cdot (e_{r2}^{(d+1)})_{\uparrow 2} \quad (26)$$

where $(\ )_{\uparrow 2}$ denotes upsampling by 2 and interpolation, which is a known procedure to those skilled in the art.

For the coarsest resolution, $h_{r2}^{(d)} = l_{r2}^{(d)}$.

Log-Likelihood Ratio Edge Refinement

By themselves, the ratios $h_{r2}^{(d)}$ usually provide good evidence for the effectiveness (or otherwise) of the foreground motion model, except for locations n that lie close to a boundary of the foreground region. For such locations, the neighborhood $\mathcal{R}_n$ used to determine the various observations, and hence $h_{r2}^{(d)}$, inevitably contains both foreground and background content. To improve the prediction strategy described in "Domains, Motion Models and Prediction" below, it is helpful to provide a local refinement of the log-likelihood ratios in these boundary regions. We denote the edge-refined $h_{r2}^{(d)}$ by $e_{r2}^{(d)}$.

In embodiments of the invention, the edge refinement procedure for a resolution d operates on $E^{(d)}[n] = g_{r2}^{(d)}[n] - g_{r1 \to r2}^{\mathcal{F},(d)}[n]$. Since this step is described within the context of a single resolution level, we find it convenient to drop the resolution level superscript, writing $E[n]$ in place of $E^{(d)}[n]$, wherever the context is clear.

Step 1: Estimating Gradient Vectors

In this step, we estimate a gradient vector $v_n$ at each location n. To do this, the localized variance of $E^{(d)}[n]$, is first found using $$S[n] = \sum_{j \in \mathcal{R}_n} \left( E[j] - \frac{1}{|\mathcal{R}_j|} \cdot \sum_{p \in \mathcal{R}_j} E[p] \right)^2 \quad (27)$$

where $|\mathcal{R}_n|$ is the number of samples in $\mathcal{R}_n$, and $\mathcal{R}_n$ is the same disc described in "A Multi-Resolution Embodiment" below. The gradient vectors $v_n$ are then found by applying a gradient operator to this localized variance image. Suitable gradient operators include Derivative of Gaussian, (DoG) filters or simpler gradient templates such as the Sobel operator. In preferred embodiments of the invention, the gradient operator incorporates low-pass filtering, either through selection of a low bandwidth Gaussian for DoG filters or through the application of a separate explicit filtering step.

The gradient vectors are normalized so that $v_n$ has magnitude 1.

Step 2: Finding the Foreground Boundary

This step finds a set of locations, denoted by $\mathcal{C}$, that lie on the boundary of the foreground region. To simplify the ensuing description, we write $\tilde{S}[n]$ for the localized variance at any arbitrary location n, not limited to integer locations. In preferred embodiments, an interpolation strategy such as bilinear interpolation is employed to evaluate $\tilde{S}[n]$ at non-integer locations; however, in other embodiments a nearest neighbour rule might be employed. We similarly write $\tilde{h}_{r2}^{(d)}[n]$ for log-likelihood ratio values $h_{r2}^{(d)}$ at locations n that might not be integer-valued.

To identify the boundary locations in $\mathcal{C}$, preferred embodiments of the invention look for local maxima in the localized variance difference values $$\delta \tilde{S}[n] = |\tilde{S}[n+r \cdot v_n] - \tilde{S}[n-r \cdot v_n]| \tag{28}$$

Specifically, we write $l_n$ for the set of $2 \cdot r+1$ locations that lie up to r pixels away on both sides of location n in the direction of the gradient vector $v_n$. That is, $$l_n = \{n+i \cdot v_n | i \in \{-r, 1-r, \ldots, r\}\} \tag{29}$$

Then, in an embodiment of this invention, a location n is judged to belong to $\mathcal{C}$ if $\delta \tilde{S}[n]$ is a local maximum over the set of locations in $l_n$; that is, $$n = \underset{j \in l_n}{\arg\max} \{\delta \hat{S}[j]\} \tag{30}$$

Step 3: Extending $h_{r2}^{(d)}$ to the Boundary

In the preferred embodiment, this step involves removing the potentially inaccurate values of $h_{r2}^{(d)}$ near the foreground boundary. To this end, we write $\mathcal{R}_C$ for the set of all locations near the foreground boundary (shown in FIG. 5); more specifically, $$\mathcal{R}_C = \bigcup_{n \in C} \mathcal{R}_n \tag{31}$$

Then, a temporary variable, s[n], is initialized with the values of $h_{r2}^{(d)}[n]$ in all locations except those locations that belong to $\mathcal{R}_C$, where s[n] is set to 0; that is, $$s[n] = \begin{cases} h_{r2}^{(d)}[n], & n \notin \mathcal{R}_C \\ 0, & n \in \mathcal{R}_C \end{cases} \tag{32}$$

Figure 5:
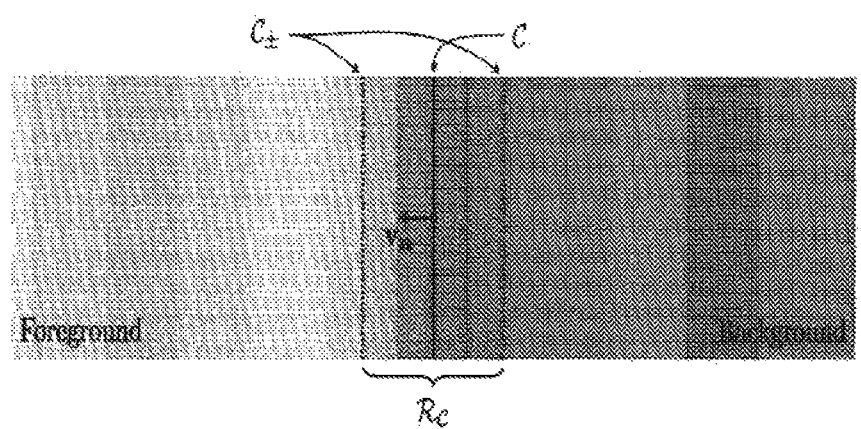
FIG. 5 is a diagram illustrating the transition between foreground and background regions.

FIG. 5 illustrates the transition between foreground and background regions. The figure shows the foreground boundary locations $\mathcal{C}$, the points on both sides of this boundary $\mathcal{C}_\pm$ at which the mean is calculated, the gradient vector $v_n$, and the region of potential inaccuracies $\mathcal{R}_C$.

Then, an embodiment of the invention estimates more accurate values for $h_{r2}^{(d)}$ than those that were removed, using locations that are further away from the foreground boundary than those in $\mathcal{R}_C$. To do this, we define a set of locations, $\mathcal{C}_\pm$, that lie on either side of the foreground boundary $\mathcal{C}$ and are r pixels away along the direction of the gradient (shown in FIG. 5); that is, $$\mathcal{C}_\pm = \{\langle n \pm r \cdot v_n \rangle | n \in \mathcal{C}\} \tag{33}$$

where $\langle \cdot \rangle$ denotes rounding to the nearest integer. The embodiment finds the average value of s in each region $\mathcal{R}_n$ associated with each location n in $\mathcal{C}_\pm$. Since roughly half of the locations in each such region $\mathcal{R}_n$ have been identified as potentially inaccurate and set to 0, we multiply these average values by 2, producing $$m_n = \frac{2}{|\mathcal{R}_n|} \cdot \sum_{j \in \mathcal{R}_n} s[j], \text{ for each } n \in C_\pm. \tag{34}$$

The final step is to replace the values in all the locations n in $\mathcal{R}_C$ with values derived from the nearby $m_j$ values, generating the edge-refined log-likelihood $e_{r2}^{(d)}$ as follows:

$$e_{r2}^{(d)}[n] = \begin{cases} h_{r2}^{(d)}[n], & n \notin \mathcal{R}_C \\ \dfrac{\sum_{j \in \mathcal{R}_n \cap C_\pm} m_j}{|\mathcal{R}_n \cap C_\pm|}, & n \in \mathcal{R}_C \end{cases} \tag{35}$$

Obtaining the Likelihood Estimate

Once these steps have been completed for a resolution d, the likelihood estimate for frame $f_{r2}$ at resolution d, denoted by $v_{r2}^{\mathcal{F}_2,(d)}$, can be obtained by applying a suitable "transducer" function to $e_{r2}^{(d)}$. One very simple function is $$v_{r2}^{\mathcal{F}_2,(d)}[n] = \begin{cases} 1, & e_{r2}^{(d)}[n] > 0 \\ 0, & e_{r2}^{(d)}[n] \leq 0 \end{cases} \tag{36}$$

Another transducer function of interest is $$v_{r2}^{\mathcal{F}_2,(d)}[n] = \begin{cases} 1, & e_{r2}^{(d)}[n] > 1 \\ \dfrac{1 + e_{r2}^{(d)}[n]}{2}, & 1 \geq e_{r2}^{(d)}[n] > -1 \\ 0, & e_{r2}^{(d)}[n] \leq -1 \end{cases} \tag{37}$$

The full-resolution likelihood estimate $v_{r2}[n]$ is simply equal to $v_{r2}^{(0)}[n]$. As before, the likelihood information for frame $f_{r1}$ at resolution d, denoted by $v_{r1}^{\mathcal{F}_2,(d)}[n]$, can be similarly formed or it can be obtained by mapping $v_{r2}^{\mathcal{F}_2,(d)}[n]$ back into the coordinates of frame $f_{r1}$ using $W_{r2 \to r1}^{\mathcal{F}_2,(d)} = (W_{r1 \to r2}^{\mathcal{F}_2,(d)})^{-1}$.

The reader will observe that the multi-resolution embodiment described above does not utilize the background motion compensated version of frame $f_{r1}$. Despite this, the method is usually able to identify the locations where the foreground motion is most appropriate. Moreover, the background motion model has lower utility for applications with only two (or a small number) of high quality reference frames, because portions of the background in frame $f_{r2}$ are inevitably covered by the foreground in frame $f_{r1}$.

The embodiments presented above are only examples of possible implementations. It will be apparent to persons skilled in the art that there is a vast array of possible ways to estimate the foreground likelihood information within a given reference frame $f_{r1}$, based on the motion models and another reference frame $f_{r2}$. The implementations described above can readily be enhanced by the inclusion of multiple data channels (e.g., color channels or depth maps), to the extent that they are available.

It will also be apparent that some embodiments could be devised that simultaneously use more than two reference frames, along with their motion models, to estimate the foreground likelihood information within any of the reference frames.

Motion Representation Using Metadata

Although metadata (such as tracking information) can be of any geometrical shape, it is usually more convenient and more efficient (in terms of data rate) to express it using predetermined geometrical shapes such as ellipses, or polygons; surveillance applications, for example, often use rectangles to encircle detectable objects or track moving objects.

We start this explanation, by discussing triangular-shaped domains; polygon domains are simple extensions of triangular domains, as any polygon can be broken into a set of mutually disjoint triangles.

Figure 6:
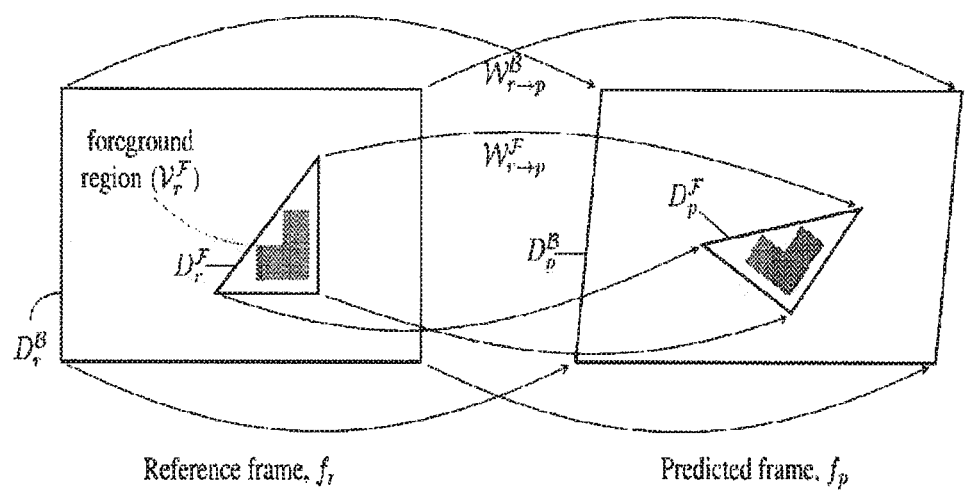
FIG. 6 is a diagram showing the relation between quadrilaterals in reference and predicted frames utilised in accordance with an embodiment of the present invention.

Each triangular-shaped domain implicitly signals the motion information associated with the region it is enclosing; in this description, the position and size of a given triangular domain in a reference frame is chosen such that its mapping to the corresponding triangular domain in the target frame using an affine model produces a good prediction for the region, $\mathcal{V}$, inside the corresponding triangular in the predicted frame, as depicted in FIG. 6. For example, the affine transform operator, $\mathcal{W}_{r \to p}^{\mathcal{F}}$, that warps the domain $D_r^{\mathcal{F}}$ of frame $f_r$, shown in FIG. 6, into the coordinates of region $D_p^{\mathcal{F}}$ of frame $f_p$ is obtained from the vertices of the triangles associated with these domains, $\mathcal{W}_{r \to p}^{\mathcal{F}} = \mathcal{W} (D_r^{\mathcal{F}}, D_p^{\mathcal{F}})$. Thus, the affine model parameters are obtained from the corresponding vertices of the triangular domains. It is also conceivable that a more complicated motion model is utilized inside each triangular domain, such as a block-based translational model or a mesh-based affine motion model; the motion model parameters, in this case, can be explicitly signaled or implicitly, as well.

Since corresponding domains need to be identified, metadata, in this embodiment, must be expressed in a way that provides mechanisms to identify related triangles/polygons/ellipses in different frames (for example the ones containing the same region). For a given triangle/polygon, metadata must also be expressed in a way that preserves the correspondence of the vertices between the reference frame and predicted frame.

One way of delivering tracking metadata in the context of JPEG2000 is to use quadrilateral regions of interest (ROI), as specified in Ammendment 3 to the JPEG2000 Part-2 standard [12]. [12] actually allows regions to be represented as unions of arbitrarily shaped quadrilaterals and also provides metadata structures that can be used to associate regions of interest that are defined for different frames.

Using the Invention to Communicate Video

As described so far, the embodiments of the invention provide a means to predict a frame $f_p$ from a set of reference frames $f_{r1}, f_{r2}, \ldots$, using tracking metadata—i.e., using the motion and associated domains that can be inferred from associated regions of interest within the various frames. This is very different from conventional motion compensation techniques, where the frame of interest is partitioned into a collection of regions (typically blocks of various sizes) and the prediction procedure for each such region is prescribed through motion parameters (typically translational motion vectors).

Since multiple reference frames are common to existing video coding strategies, it is possible to use embodiments of the invention as a replacement for the motion compensated prediction procedure found in existing coders. For example, one could replace the prediction process found in any of the MPEG-2, MPEG-4, H.263 or H.264 video coding standards with an embodiment of the invention described here. In these closed loop video compression schemes, the prediction process used by the decoder should be replicated at the encoder, using the quantized version of the reference frames to which the decoder has access. The key departure from traditional video compression, in this case, is that the predicted frames are formed using overlapping invertible motion descriptions whose valid regions are recovered at both the encoder and decoder using the likelihood estimation and mapping procedures described above.

As mentioned earlier, a major intended application for embodiments of the invention is the communication of video using the JSIV approach, where motion compensated prediction is employed only at the decoder (or client). In a typical application, the client may have access to high quality reference frames $f_{r1}$ and $f_{r2}$ that have been sent by a server in response to a particular query. Using an embodiment of the invention, together with tracking metadata, the client forms a prediction for an intermediate frame $f_p$. The JSIV server forms a crude estimate of the degree to which different regions of $f_p$ can be predicted, at each resolution level within a Discrete Wavelet Transform of the frame. Based on this information, the server sends important data that are unlikely to be well predicted. The JSIV approach works with JPEG2000 as the compression technology for each frame and sends JPEG2000 precinct quality layers, according to the available transmission resources and the degree to which $f_p$ is likely to be predicted. The JSIV client fuses this information with its prediction of frame $f_p$ in order to reconstruct a higher quality version $f_p$. Thereafter, the reconstructed frame $f_p$ can itself be used as a reference frame for the prediction of other frames, until eventually all frames have been reconstructed using the video frame data (JPEG2000 precinct quality layers) communicated by the server, together with the tracking metadata.

In a typical JSIV setup, the server optimally selects the number of quality layers for each JPEG2000 precinct it is transmitting and the client makes most of what it receives and what is available in its cache. The significance of embodiments of this invention is that it allows the video content to be communicated efficiently, by exploiting the tracking metadata that in many applications is valuable and interesting to the client in its own right. Since the server does not need to emulate the reconstruction process used by the client, the client is free to use any suitable variation of the invention described here and the client is also free to choose the reference frames of highest quality when forming its predictions.

To benefit from the approach of embodiments of this invention, the server should be capable of approximately modeling distortions in the predicted frames obtained using the method of this invention; distortion modeling also involves modeling of the effects of the delivered quantized frame data on the quality of the foreground likelihood information estimated at the client. Ideally, the server also optimizes its delivery of tracking metadata to the client. While optimally selecting what metadata to send is the job of the server, the actually delivery of the optimal selection is achievable using the JPIP standard (IS15444-9).

For the client to benefit from this invention, it should be capable of interpreting the tracking metadata it receives, estimating the foreground likelihood information, and forming predicted frames using the approach of embodiments of this invention. Apart from this, the rest of the client and server operation is similar to that described in [2, 3].

Embodiments of this invention describe a method and apparatus for communicating crude motion information using tracking metadata and recovering more accurate motion information from the received tracking metadata and partial video frame data; in embodiments, we use metadata to convey crude boundaries of objects in the scene and signal motion information for these objects. The proposed method leaves the task of identifying the exact boundaries of an object to the decoder/client. The proposed method is particularly appealing when metadata itself carries semantics that the client is interested in, such as tracking information in surveillance applications, because, in this case, metadata does not constitute an overhead.

The proposed method involves motion descriptions that can be used to predict the appearance of an object in any one frame from its appearance in any other frame that contains the object. That is, the motion information itself allows locations within an object to be invertibly mapped to locations within the same object in any other relevant frame. This is a departure from conventional motion coding schemes, which tightly-couple motion information to the prediction strategy. This property makes the proposed method particularly suitable for applications which require flexisble access to the content.

In this document, we give a detailed description of how tracking metadata is used in describing motion; we also detail how object boundaries are obtained from the combination of tracking metadata and partial video frame data. We focus on the application of the proposed method in the context of the recently introduced JPEG2000-based scalable interactive video (JSIV) paradigm.

Embodiments are also applicable to conventional video coding approaches, including closed loop video coding structures such as those used in MPEG1 to MPEG4. In closed loop schemes, however, the invention is used to predict frames in both the encoder and the decoder.

In embodiments, the present invention may be implemented by an appropriately configured computer processor. Embodiments may be implemented in code (software) or in hardware (e.g. programmable gate arrays or similar) or a mixture of hardware and software. In an embodiment, the invention may be implemented as a video decoder client.

Where implemented using a processor, the processor may be implemented with any suitable architecture.

Figure 7:
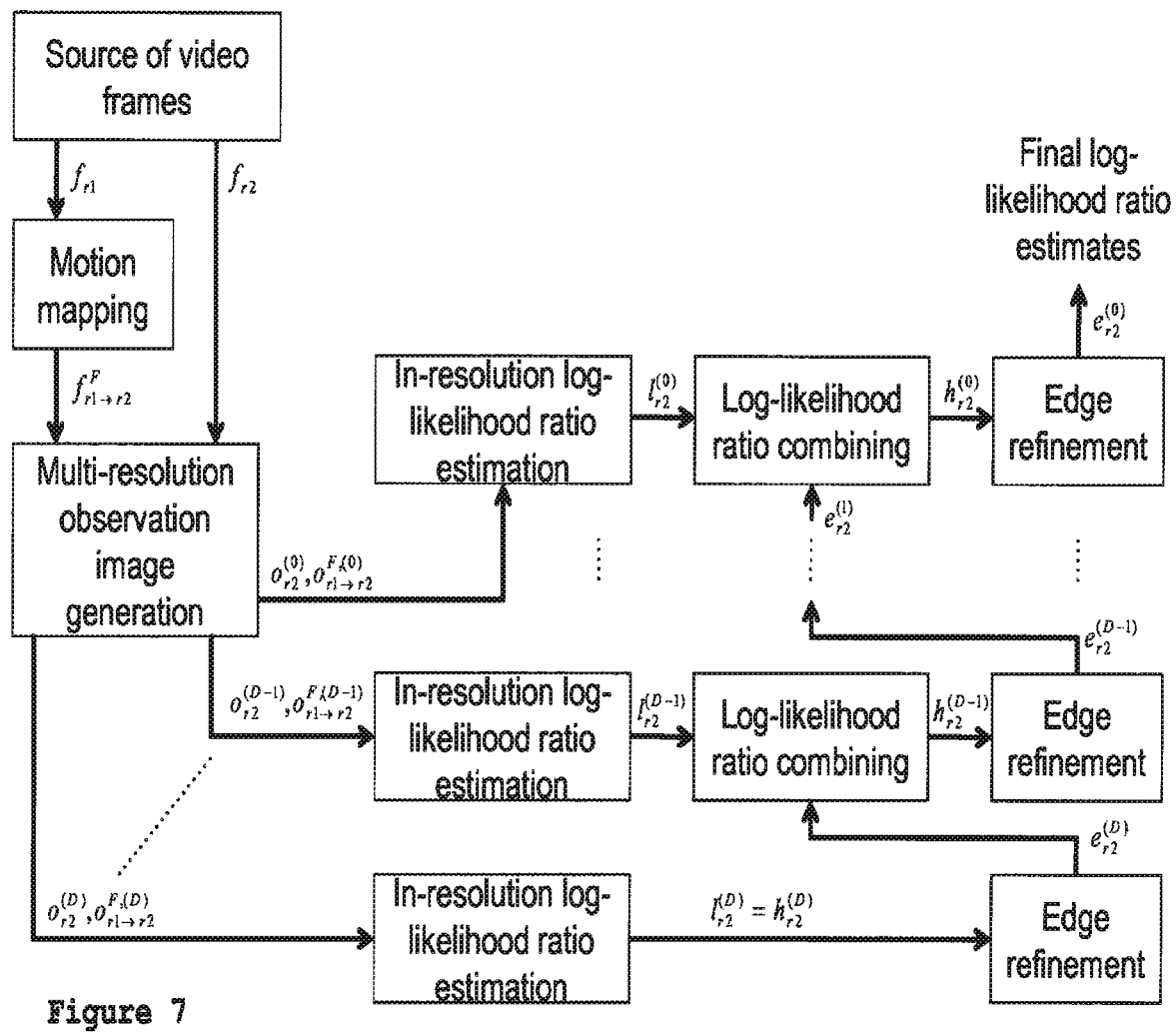
FIG. 7 is a functional block diagram illustrating operation of an apparatus in accordance with an embodiment of the present invention.

FIG. 7 shows a functional block diagram of a Processor for implementing "estimation". FIG. 7 shows a series of processing blocks for taking two reference frames, mapping one to the other using the foreground motion associated with the foreground domain, building multi-resolution decomposition to obtain resolution dependent observation images, and also processing steps involved in forming the first, second and final likelihood fields within each resolution level.

Figure 8:
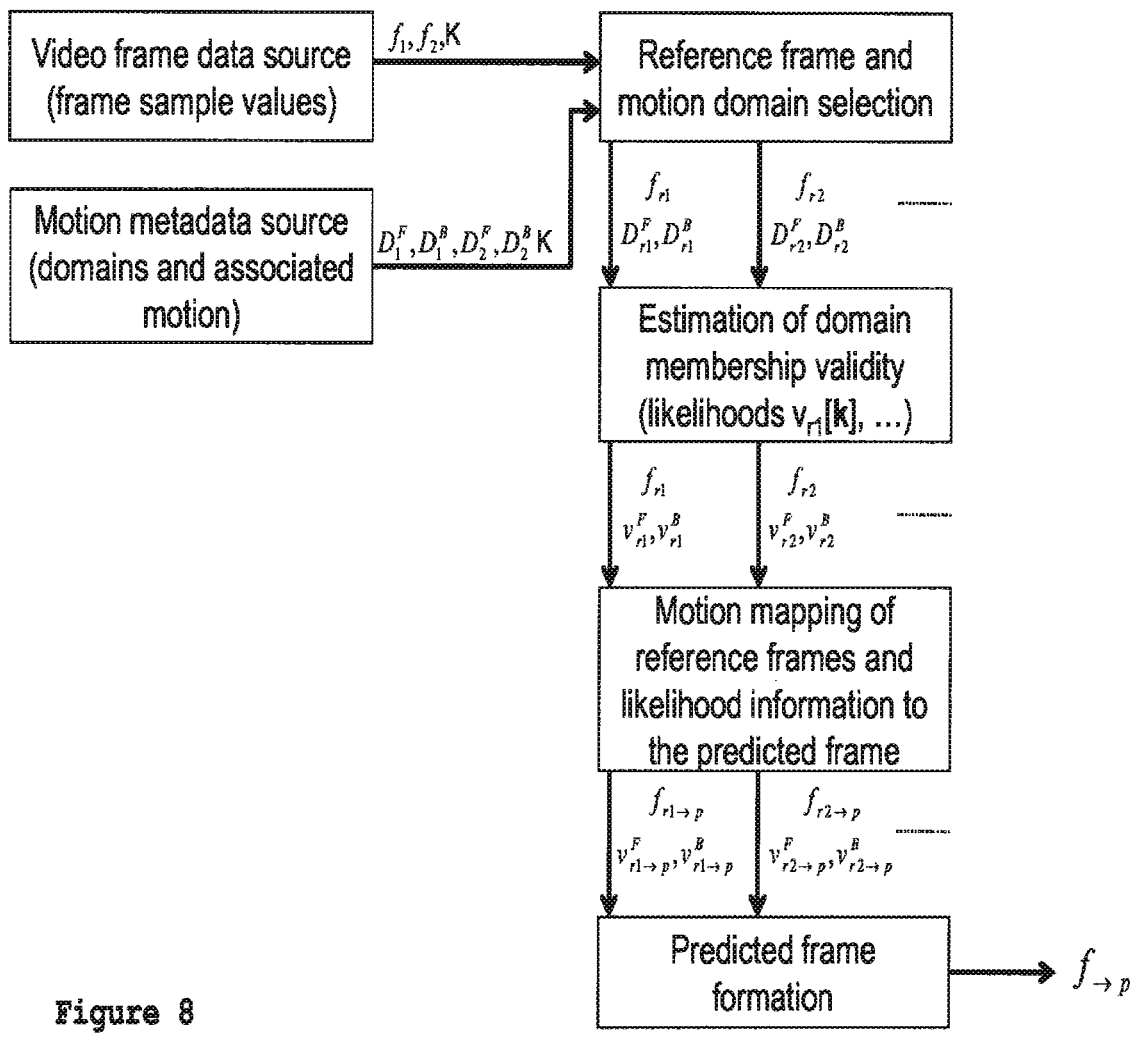
FIG. 8 is a further functional block diagram illustrating operation of an apparatus in accordance with an embodiment of the present invention.

FIG. 8 shows blocks implementing the process of selecting reference frames, constructing validity (likelihood) information, and then predicting a frame.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

REFERENCES

[1] A. Secker and D. Taubman, "Lifting-based invertible motion adaptive transform (LIMAT) framework for highly scalable video compression," *IEEE Trans. Image Proc.*, vol. 12, no. 12, pp. 1530-1542, December 2003.

[2] A. Naman and D. Taubman, "JPEG2000-based scalable interactive video (JSIV)," *Image Processing, IEEE Transactions on*, Accepted for publication with mandatory minor revisions.

[3] - - - , "JPEG2000-based scalable interactive video (JSIV) with motion compensation," *Image Processing, IEEE Transactions on*, Submitted for publication.

[4] E. Hung, R. De Queiroz, and D. Mukherjee, "On macroblock partition for motion compensation," in *Image Processing, 2006 IEEE International Conference on*, October 2006, pp. 1697-1700.

[5] O. Divorra Escoda, P. Yin, C. Dai, and X. Li, "Geometry-adaptive block partitioning for video coding," in *Acoustics, Speech and Signal Processing, 2007. ICASSP 2007. IEEE International Conference on*, vol. 1, April 2007, pp. I-657-I-660.

[6] A. Muhit, M. Pickering, and M. Frater, "A fast approach for geometry-adaptive block partitioning," in *Picture Coding Symposium, 2009. PCS 2009*, May 2009, pp. 1-4.

[7] - - - , "Motion compensation using geometry and an elastic motion model," in *Image Processing (ICIP), 2009 16th IEEE International Conference on*, November 2009, pp. 621-624.

[8] M. Tagliasacchi, M. Sarchi, and S. Tubaro, "Motion estimation by quadtree pruning and merging," in *Multimedia and Expo, 2006 IEEE International Conference on*, July 2006, pp. 1861-1864.

[9] R. Mathew and D. Taubman, "Quad-tree motion modeling with leaf merging," *Circuits and Systems for Video Technology, IEEE Transactions on*, vol. 20, no. 10, pp. 1331-1345, October 2010.

[10] - - - , "Scalable modeling of motion and boundary geometry with quad-tree node merging," *Circuits and Systems for Video Technology, IEEE Transactions on*, vol. 21, no. 2, pp. 178-192, February 2011.

[11] D. Taubman, R. Mathew, and N. Mehrseresht, "Fully scalable video compression with sample-adaptive lifting and overlapped block motion," *SPIE Electronic Imaging (San Jose)*, vol. 5665, pp. 366-377, January 2005.

[12] ISO/IEC 15444-2:2004/FDAmd 3, "Extended ROI boxes, XML boxing, compressed channel definition boxes, representation of floating point data and box-based file format for JPEG-XR," under development.

The invention claimed is:

1. A method for a decoder recovering motion information within coded multiple frame media content, using decoded video frame sample data for two or more frames, together with auxiliary motion data that carries information about motion between frames, the auxiliary motion data being additional to the coded multiple frame media content, comprising the following steps:
   (a) selecting two or more decoded reference frames to be used in predicting a further frame;
   (b) using the auxiliary motion data to identify at least two overlapping spatial domains within a first decoded reference frame, to group each of the two or more decoded reference frames with a corresponding spatial domain in each of the other decoded reference frames, and to determine a parametric representation of motion between corresponding domains in different reference frames;
   (c) using auxiliary motion data, domain correspondences, and decoded reference video frame sample values to determine validity information for each overlapping domain within the first reference frame;
   (d) using the parametric motion representations, domain correspondences, and decoded reference video frame sample values to determine validity information for each overlapping domain within each of the other reference frames;

(e) using the parametric motion representations, validity information, and decoded reference frame sample values to form a prediction of the further frame.

2. The method of claim 1, comprising a further step of iteratively applying steps (a) to (e) to the prediction of additional frames.

3. The method of claim 1, wherein the communicated motion data is tracking metadata, wherein the spatial domains are tracked regions of interest and where domain correspondences are obtained from the tracking semantics.

4. The method of claim 3, where the parametric motion representations are obtained from the geometry of the tracked regions of interest.

5. The method of claim 1 wherein successive iterations of the steps predict frames in a hierarchical fashion, such that each frame is predicted using two reference frames and the frames that are predicted in one level of the hierarchy may be selected as reference frames when predicting other frames in the next level of the hierarchy.

6. The method of claim 1, wherein the validity information within at least one of the reference frames is obtained by motion compensating the validity information found for a corresponding domain within another reference frame.

7. The method of claim 1, wherein the predicted frame is obtained by motion compensating each reference frame, within each of the overlapping spatial domains, using the associated parametric motion models and forming a weighted combination of the resulting motion compensated sample values, where the weights are based on the validity information for each domain.

8. The method of claim 4, wherein the video frame sample data is available in the form of images compressed using the JPEG2000 image compression standard, and a portion of the compressed representation and auxiliary metadata is communicated as the communicated motion data to a client using the JPIP standard, that portion being used to reconstruct content that has not been communicated, wherein the tracked regions of interest are rectangular bounding boxes and the parametric motion representations are invertible warping operators that map the bounding box in one frame to the corresponding bounding box in each of the other frames of interest.

9. An apparatus for recovering motion information within coded multiple frame media content, using decoded video frame sample data for two or more frames, together with auxiliary motion data that carries information about motion between frames, the auxiliary motion data being additional to the coded multiple frame media content, the apparatus comprising:
one or more processors; and
memory storing processor-executable instructions that, when executed by the one or more processors, cause the apparatus to:
(a) select two or more decoded reference frames to be used to predict a further frame;
(b) use the auxiliary motion data to identify at least two overlapping spatial domains within a first decoded reference frame, to group each of the two or more decoded reference frames with a corresponding spatial domain in each of the other decoded reference frames, and determine a parametric representation of motion between corresponding domains in different reference frames;
(c) use auxiliary motion representations, domain correspondences, and decoded reference video frame sample values to determine validity information for each overlapping domain within the first reference frame;
(d) use the parametric motion representations, domain correspondences, and decoded reference video frame sample values to determine validity information for each overlapping domain within each of the other reference frames;
(e) use the parametric motion representations, validity information, and decoded reference frame sample values to form a prediction of the further frame.

10. An apparatus in accordance with claim 9, the apparatus comprising a video signal decoder.

11. A non-transient computer readable medium, comprising instructions for controlling a computer to implement a method in accordance with claim 1.

* * * * *